United States Patent

[11] 3,624,349

[72] Inventor Rolf Mayer
Giengen, Germany
[21] Appl. No. 884,200
[22] Filed Dec. 11, 1969
[45] Patented Nov. 30, 1971
[73] Assignee Robert Bosch Hausgerate GmbH
Giengen, Germany
[32] Priority Dec. 14, 1968
[33] Germany
[31] G 68 11 478

[54] PORTABLE WELDING DEVICE
10 Claims, 5 Drawing Figs.

[52] U.S. Cl. ................................................. 219/243,
156/515
[51] Int. Cl. ..................................................... H05b 1/00
[50] Field of Search ........................................ 219/243;
100/93 P; 156/515; 93/583

[56] References Cited
UNITED STATES PATENTS
3,106,630 10/1963 Klamp ........................ 219/243 X
3,375,777 4/1968 Techtmann et al. .......... 219/243 X FOREIGN PATENTS
969,962 6/1950 France ........................ 219/243
1,307,307 9/1962 France ........................ 219/243

Primary Examiner—C. L. Albritton
Attorney—Michael S. Striker

ABSTRACT: A substantially hollow supporting base made from a plastic material comprises an upper elongated supporting surface for the support of a plurality of plastic layers to be welded and a depressible pressure member cooperating with and movable relative to the supporting surface between a rest position and a welding position. An electric heating wire is connected to and extends along the elongation of the supporting surface for welding, in association with the pressure member, the plurality of plastic layers. All the other electrical components necessary for alternatingly heating the heating wire, are accommodated in the hollow interior of the supporting base.

PATENTED NOV 30 1971
3,624,349
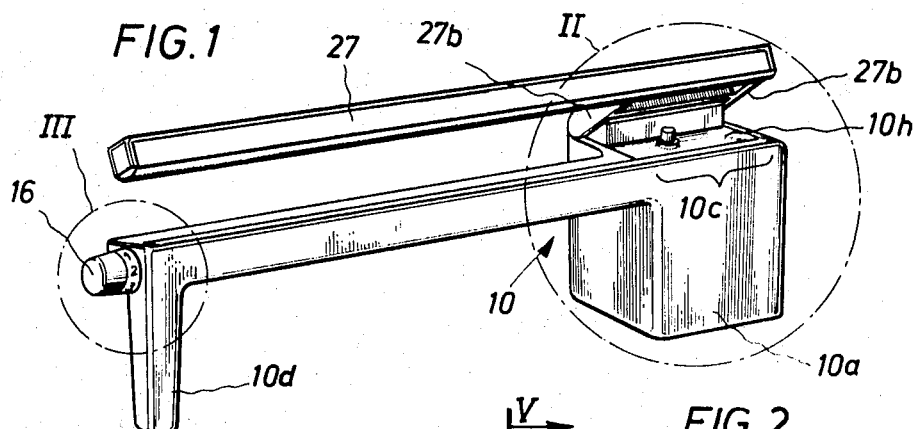
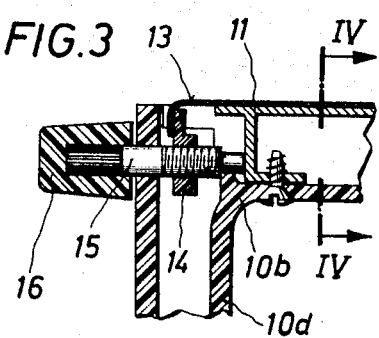
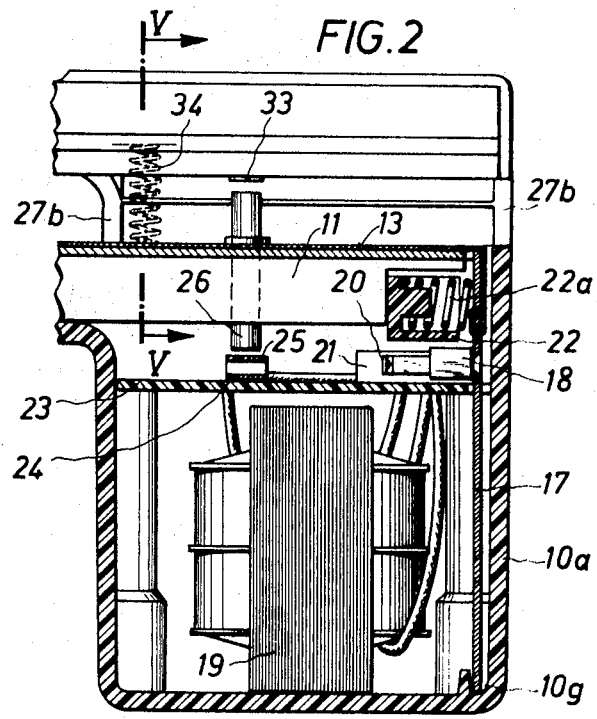
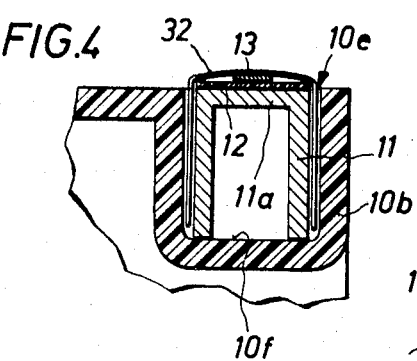
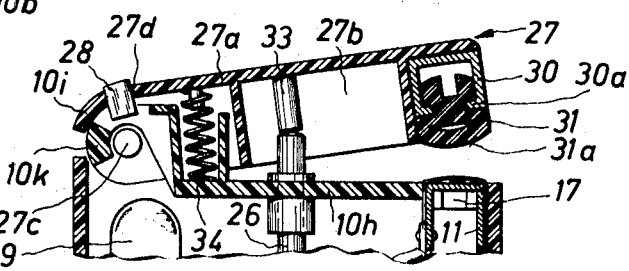
INVENTOR.
ROLF MAYER
BY

PORTABLE WELDING DEVICE

BACKGROUND OF THE INVENTION

The present invention relates to a portable welding device especially for use in households for fusing or welding together a plurality of plastic foils, or analogous material, by heat and pressure.

Already known and available for quite some time are plastic bags used for the packaging of cold and/or frozen food articles, and the like, in order to preserve and/or otherwise protect such packaged items.

Upon placing or enwrapping the articles in the plastic bag, the latter, usually, is hermetically sealed by heat and/or pressure sealing and is provided with an easily severable corrugated seal, or any other type of suitable seal.

However, such sealing of the plastic bags, usually is done in the meat markets, supermarkets, and the like, but is never, or very rarely done in the home which, upon initial opening of the sealed plastic bags by the consumer, presents the difficulty that the plastic bags, thus opened, cannot easily be resealed again and, therefore, such bags only are good for a one-time use. In addition, cleaning of such used bags is difficult.

On the whole, this problem further exists in the household when articles for one reason or another, have to be hygienically and thus hermetically sealed or wrapped in plastic or analogous material, and such cover material cannot be easily sealed simply for lack of a suitable home welding device.

This situation is rather uneconomical and, in addition, makes the use of such plastic bags relatively expensive.

SUMMARY OF THE INVENTION

Object of the present invention is to overcome the above disadvantages and to provide an electrically operated portable home welding device especially adapted for use in households and which permits easy and hygienic packaging of a great assortment of food or analogous articles and economical use of plastic or analogous material.

Such a portable welding device adapted for welding or fusing a plurality of layers of a plastic or analogous material comprises a supporting base made from plastic material and which includes an upper supporting surface for supporting a plurality of plastic layers to be welded, and a pressure member cooperating with and movable relative to the supporting surface between a first rest position and a second welding position. An electric heating wire for welding the plurality of fusible layers in association with the pressure member, is supported on and extends along the elongation of the supporting surface, and all the other electrical components required for alternatingly heating the electric heating wire, are accommodated in the supporting base.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 illustratively shows a portable home welding device according to the present invention;

FIG. 2 shows an enlarged cross-sectional view of that part of the construction of the welding device of FIG. 1 located within the confines bounded by the circle II, FIG. 1;

FIG. 3 shows an enlarged cross-sectional view of a further part of the construction of the welding device of FIG. 1 located within the confines bounded by the circle III, FIG. 1;

FIG. 4 shows an enlarged cross-sectional view taken on line IV—IV, FIG. 3; and

FIG. 5 shows a cross-sectional view taken on the line V—V, FIG. 2.

DESCRIPTION OF THE PREFERRED EMBODIMENTS

Referring now to the drawings in which like reference numerals index like parts and with attention initially directed to FIG. 1, the electric welding device especially for use in households for fusing or welding a plurality of fusible foils, such as plastic foils, according to the present invention is seen to comprise a plastic housing 10 which accommodates all the required electric components of the welding device, as will hereinafter be described. The housing 10 essentially comprises a hollow base 10a and an arm 10b which projects laterally from one side of the base 10a and has an overall substantially hollow U-shaped cross-sectional configuration. The upper portion 10c of the base 10a and the upper surface of the arm 10b as such, together constitute an elongated support ledge 10b, c for the fusible foils and the arm 10b has its free end, which is turned away from the base 10a, supported by a unitary support foot or leg 10d, disposed at the lower surface at this free end.

For simplification purposes, hereinafter reference will be made to the support ledge as being indexed with 10b, c.

Extending along the elongation of the support ledge 10b, c and defined in part by the U-shaped profile of arm 10b, is a longitudinal substantially U-shaped groove 10e having an upwardly oriented open end, as clearly shown in FIG. 4. Accommodated in the U-shaped groove 10e is a U-beam 11 which is made of an electrically conductive material and which, with the longitudinally extending free lower ends of its downwardly orientated legs, rests upon the closed base or bottom 10f of the U-shaped groove 10e. The base portion 11a of the U-beam 11 extends substantially level with the support surface of the support ledge 10b, c and, at its upwardly orientated surface, is provided with a heat-resistant insulating strip 12 made of a material having a low coefficient of friction, e.g. polytetrafluoroethylene. The insulating strip 12 extends along the entire elongation of the U-beam 11 and is sandwiched between the same and a heating wire 13 superimposed on the strip 12 and the upwardly orientated surface of the base of the U-beam 11 and with the axially opposite end faces of the heating wire 13 downwardly bent behind the respective end faces of U-beam 11.

As shown in FIG. 3, one of the axially opposite end faces of the heating wire 13 is anchored in a variable joint 14 at one end of the support ledge 10b, c. The variable joint 14 is axially adjustable relative to the heating wire 13 by means of an adjustable screw member 15 which is rotatably mounted in the arm 10b and the free outer end of which extends through and projects laterally from the arm 10b and is provided with a turnable knob 16 which permits manual adjustment of the tensile stress of the heating wire 13.

As shown in FIG. 2, the other of the end faces of the heating wire 13 is downwardly bent at the other end of the support ledge and is connected to the upper portion of an upstanding switch lever 17 which extends at this end in the base 10a and is pivotably mounted therein at a pivot location 10g.

Riveted to the switch lever 17 is a bolt member 18 which, is unheated or switched off condition of the heating wire 13, depresses and closes the on-contact 20 of an electric on-off switch 21 incorporated in the electric primary circuit of an electric transformer 19. Engaging the switch lever 17 with its one end and abutting against the end wall of a spring support 22 in the base 10a with its other end, is a pressure spring 22a which is operative to normally bias the switch lever 17 in outward direction so as to disengage the bolt member 18 from the on-contact 20 in order to release the same and to open the primary circuit of the transformer.

The heating wire 13 is made of a material which has a high coefficient of thermic heat expansion and is incorporated in the electric secondary circuit of the transformer 19 in the base 10a.

As clearly shown in FIG. 2, a switch plate 23 is mounted above the transformer 19 in the base 10a. Provided at the upper surface of the switch plate 23 is a further switch member 24 which is electrically coupled to the switch 21 and is provided with a movable contact tongue 25. Arranged directly above the contact tongue 25 in the base 10a, is a depressable button 26 which upon depression, starts or initiates the fusing or welding process of the welding device in that depression of the same and subsequent engagement of its lower end with the contact tongue 25, causes depression of the latter and engagement thereof with the switch member 24, which connects the primary circuit of the transformer 19 to a source of constant electrical energy, not shown. The heating wire 13 incorporated in the electric secondary circuit of the transformer 19, subsequently, is heated and expands along its entire elongation. During this expansion of the heating wire 13, the switch lever 17 under the spring tension of spring member 22a is pivoted about its pivot point 10g in direction away from the switch 21 which, as a result, breaks the contact and opens the circuit between the bolt member 18 and the on-contact 20 and thus disrupts the primary circuit of the transformer 19. Simultaneously, the current supply to the heating wire 13 is disrupted as a result of which the same cools and contracts and returns to its initial starting condition, shown in FIG. 1. The switch lever 17, now returns to its initial position in which the bolt member 18 again depresses and closes the on-contact 20.

By depressing the pushbutton 26 for a longer period of time, the welding or fusing process is periodically repeated which suitably enables the fusing or welding of relatively thick foils.

In order to press the fusible foils against the heating wire 13, the welding device is provided with a depressible pressure ledge 27 which is pivotably mounted about an axis on the upper portion of the base 10a and has an overall configuration substantially matching that of the base 10a and the support ledge 10b, c. The pressure ledge 27 is movable between a first rest position, shown in FIG. 1, and a second welding position, not shown, in which the same is moved toward the support ledge 10b, c to confine the fusible layers between the inner pressure surface of the pressure ledge 27 and the support surface of the support ledge 10b, c.

The pressure ledge 27 is connected to a cover plate 10h which closes the upper or foil-support side of the hollow base 10a, FIGS. 1 and 5, and is provided with two parallel but spaced hinge hooks 10i interconnected by an axially extending bridge member 10k which also serves as a stop member for the pressure ledge 27, as will presently be described.

The pressure ledge 27 is seen to be constituted by a plane section 27a which is laterally bounded by and integral with two parallel spaced wall sections 27b each of which, at its inner end, is arranged with a movable pivot 27c each of which engages one of the spaced hinge hooks 10i on the cover plate 10h.

Arranged in a parallel plane with and adjacent the pivots 27c in section 27a of the pressure ledge 27, is an elongated slot 27d in which a transparent illuminating ledge 28 is clampingly received. The illuminating ledge 28 is seen to project through the wall of the pressure ledge 27 at the inner end thereof, and serves to limit the pivot movement of the pressure ledge 27 in direction away from the support ledge 10b, c by engaging the bridge and stop member 10k in this direction.

A pilot light or control lamp 29 is arranged beneath the illuminating ledge 28 in the base 10a and is incorporated in the electric circuit of the heating wire 13 and serves to indicate the hereinbefore described on-and-off position of the switch.

Cooperating with the U-beam 11 in the support ledge 10b, c, is a straight and substantially correspondingly shaped U-beam 30 connected in the pressure ledge 27 and having the free lower ends 30a of its downwardly orientated legs inwardly bent so as to clampingly retain a substantially correspondingly shaped rubber strip 31 having a protruding flexible pressure surface 31a.

By depressing the pressure ledge 27, the pressure surface 31a of the rubber strip 31 will abuttingly engage the U-beam 11 of the support ledge 10b, c, which support the heating wire 13.

To protect the rubber strip 31 and the fusible foils, the U-beam 11 including the superimposed plastic strip 12 and the heating wire 13, is enclosed by a cover 32 made of a heat resistant unwettable plastic material.

As shown in FIGS. 2 and 5, the pressure ledge 27 at its lower surface, is provided with a piston member 33 which, upon depression of the ledge 27 in direction toward the support ledge 10b, c, operatively engages the pushbutton 26, which, as already described hereinbefore, permits closing of the electric circuit of the transformer 19 and heating of the heating wire 13.

A pressure spring 34 having its one end abutting against the cover plate 10h of the base 10a and its other end abutting against the pressure ledge 27, serves to return the latter into or retain the same in its starting or rest position in which the illuminating ledge 28 engages the stop member 10k of the cover plate 10h.

It will be understood that each of the elements described above or two or more together may also find a useful application in other types of welding devices differing from the types described above.

While the invention has been illustrated and described as embodied in FIGS. 1 through 5, it is not intended to be limited to the details shown, since various modifications and structural changes may be made without departing in any way from the spirit of the present invention.

Without further analysis the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A portable welding device for fusing a plurality of fusible layers, particularly layers of plastic material, comprising, in combination, support means comprising an upright base and an elongated arm portion projecting laterally from said base and having a free outer end; an upright support member on said outer free end of said arm portion for supporting said outer end; an elongated upper support face provided on said base and said elongated arm portion for supporting a plurality of fusible layers thereon; pressure means mounted on said base movable relative to said upper support face between a rest position and a welding position for engaging in said welding position a plurality of fusible layers on said support face and for pressing the same against said support face; and welding means associated with said upper support face for heating said fusible layers pressed by said pressure means onto said support face so as to weld said fusible layers to each other.

2. A device as defined in claim 1, wherein said base, said elongated arm portion and said upright support member are integrally connected to each other.

3. A device as defined in claim 1, wherein said base and said arm portion constitute a housing, and wherein said welding means are electric welding means comprising an electric heating wire supported on said elongated support face for heating engagement with said plurality of fusible layers, and electric circuit means accommodated in said base and including switch means for periodically electrically actuating said heating wire for heating the same and thereby said plurality of fusible layers.

4. A device as defined in claim 3, wherein said support face is electrically nonconductive and has axially opposite ends and comprises a groove longitudinally extending between said opposite ends and support means in said groove for supporting said electric heating wire, said support means comprising a longitudinally extending electrically conductive support beam having leg portions abutting the bottom of said groove and having an upper portion supporting said electric heating wire.

5. A device as defined in claim 45 wherein said longitudinally extending groove in said support face has a substantially rectangular cross-sectional configuration, and wherein said longitudinally extending support beam has a substantially inverted U-shaped cross-sectional configuration, said upper portion of said support beam supporting said electric heating wire constituting the base portion of said beam and extending substantially level with said support surface.

6. A device as defined in claim 5, wherein said electric heating wire is provided with thermoplastic insulating means comprising a first layer sandwiched between said electric heating wire and said base portion of said support beam and being heat-resistant and having a low coefficient of friction, and a second layer superimposed on said electric heating wire and being heat-and-fluid resistant.

7. A device as defined in claim 6, wherein said electric heating wire has opposite ends with one of said axially opposite ends adjustable mounted at one of said axially opposite ends of said support face, and with the other of said ends electrically connected to said electric switch means located in said base at the other of said axially opposite ends of said support surface.

8. A device as defined in claim 7, wherein said one end of said support face adjustably mounting said one end of said electric heating wire, is provided with manually operable adjustment means for varying the tensile stress of said electric heating wire, said adjustment means comprising retaining means retaining said one end of said electric heating wire and an adjustable screw member abutting against said one end of said support surface and operative for displacing said retaining means relative to said one end of said support face in direction normal to the elongation of said electric heating wire.

9. A device as defined in claim 1, wherein said pressure means is pivotably mounted on said base about an axis substantially parallel with the elongation of said support face.

10. A device as defined in claim 3, wherein said pressure means is pivotally mounted on said base and having a lower pressure face of a size and configuration substantially identical to that of said support face, and including a transparent member in said pressure means, pilot light means on said base beneath said transparent member and in circuit with said switch means to indicate actuation of said heating wire.

* * * * *